United States Patent
Weiss (10) Patent No.: US 11,180,208 B2
(45) Date of Patent: Nov. 23, 2021

(54) MOBILE CARRIER WITH INTERCHANGEABLE PAYLOADS

(71) Applicant: Piaggio Fast Forward, Inc., Boston, MA (US)

(72) Inventor: Mitchell Weiss, Carlisle, MA (US)

(73) Assignee: PIAGGIO FAST FORWARD, INC., Boston, MA (US)

(*) Notice: Subject to any disclaimer, the term of this patent is extended or adjusted under 35 U.S.C. 154(b) by 148 days.

(21) Appl. No.: 16/660,570

(22) Filed: Oct. 22, 2019

(65) Prior Publication Data

US 2020/0122797 A1    Apr. 23, 2020

Related U.S. Application Data

(60) Provisional application No. 62/749,111, filed on Oct. 22, 2018.

(51) Int. Cl.
| | |
|---|---|
| *B62D 63/02* | (2006.01) |
| *B62D 61/00* | (2006.01) |
| *B62D 37/00* | (2006.01) |
| *B62H 1/10* | (2006.01) |
| *B62K 11/00* | (2006.01) |

(52) U.S. Cl.
CPC ............... *B62H 1/10* (2013.01); *B62D 61/00* (2013.01); *B62D 63/02* (2013.01); *B62D 37/00* (2013.01); *B62K 11/007* (2016.11)

(58) Field of Classification Search
CPC ........ B62D 37/00; B62D 61/00; B62D 63/02; B62K 11/00; B62H 1/10

USPC ............................. 280/293; 414/679; 180/21
See application file for complete search history.

(56) References Cited

U.S. PATENT DOCUMENTS

| | | | |
|---|---|---|---|
| 4,406,085 | A | 9/1983 | Rhodes |
| 7,188,694 | B1 * | 3/2007 | Blair ....................... B60B 19/06 |
| | | | 180/218 |
| 9,572,467 | B2 | 2/2017 | Dyson et al. |
| 9,677,294 | B2 | 6/2017 | Renaud et al. |
| 10,227,081 | B2 | 3/2019 | Ferrell et al. |
| 2013/0087393 | A1 | 4/2013 | Vanderstegen-Drake et al. |
| 2013/0305483 | A1 | 11/2013 | Dyson et al. |
| 2014/0259464 | A1 | 9/2014 | Renaud et al. |
| 2018/0194267 | A1 | 7/2018 | Helou, Jr. |
| 2018/0327013 | A1 * | 11/2018 | Ferrell .................. E04H 4/1654 |
| 2019/0216012 | A1 * | 7/2019 | Hahn ................... A01D 34/008 |

OTHER PUBLICATIONS

International Search Report and Written Opinion dated Jan. 9, 2020 issued in corresponding International Application No. PCT/US/2019/057476.

* cited by examiner

*Primary Examiner* — Minnah L Seoh
*Assistant Examiner* — Felicia L. Brittman
(74) *Attorney, Agent, or Firm* — Onello & Mello, LLP (57) ABSTRACT

A mobile carrier apparatus comprises a chassis, a drive mechanism supported by the chassis and arranged to drive a plurality of wheels, a body supported by the chassis and an internal volume defined within the body, and an opening in the body that provides access to the internal volume, a rim formed within the opening and including a support surface configured to receive and support a removable payload above the chassis. A payload can be provided that is configured for use with a mobile carrier.

46 Claims, 6 Drawing Sheets

MOBILE CARRIER WITH INTERCHANGEABLE PAYLOADS

CROSS REFERENCE TO RELATED APPLICATIONS

The present application claims priority to U.S. Provisional Patent Application No. 62/749,111 entitled Mobile Carrier with Interchangeable Payloads, filed Oct. 22, 2018, which is incorporated herein in its entirety.

FIELD OF INTEREST

The present description relates generally to vehicles, and more particularly, but not exclusively, to stabilization systems for two-wheeled vehicles having axially aligned wheels.

BACKGROUND

A growing number of vehicles and/or robots are becoming available for the purpose of transporting goods. The typical vehicles and/or robots use three, four or six wheels to provide propulsion and steering control during normal operation of the vehicle. Such vehicles and/or robots rely upon static stability and are designed for stability in all operating conditions via the location of the wheels. A separation distance between the wheels in the longitudinal, or backwards and forward direction, balances out applied torques due to gravity or inclines. Thus, in the typical vehicle stability is achieved by implementing an appropriate separation distance between the wheels in the longitudinal direction of the vehicle, thereby making the vehicle more resilient to disruptions along the lateral axis.

However, an issue exists in situations where attempts have been made to transport goods in two-wheeled vehicle having wheels located in the lateral, or side-by-side, direction, versus in the traditional longitudinal direction. The challenge of using the vehicles having only two wheels mounted in the lateral, side-by-side configuration is in maintaining dynamic stability of the vehicle during normal operation.

SUMMARY

In accordance with one aspect of the present disclosure, provided is a mobile carrier apparatus, comprising a chassis, a drive mechanism supported by the chassis and arranged to drive a plurality of wheels, a body supported by the chassis and an internal volume defined within the body, and an opening in the body that provides access to the internal volume, a rim formed within the opening and including a support surface configured to receive and support a removable payload above the chassis.

In various embodiments, the plurality of wheels is two wheels.

In various embodiments, the plurality of wheels includes first and second wheels partially encased by the body.

In various embodiments, the support surface of the rim extends laterally to have a width.

In various embodiments, the support surface of the rim is substantially flat.

In various embodiments, the support surface of the rim is substantially continuous.

In various embodiments, the support surface of the rim is configured to suspend the removable payload within the internal volume.

In various embodiments, the rim is disposed at a surface of the body.

In various embodiments, the rim is disposed below a surface of the body and within the internal volume.

In various embodiments, the rim includes a coupling mechanism configured to removably attach the payload to the rim.

In various embodiments, the coupling mechanism includes at least one magnet.

In various embodiments, the coupling mechanism includes at least one male and/or female structure configured to receive at least corresponding female and/or male structure of the payload.

In various embodiments, the removable payload is chosen from a group consisting of storage container or bin a thermal container, and an entertainment system.

In various embodiments, the body includes a lid configured to close the opening in the body.

In various embodiments, the lid is configured to seal the opening in the body to create an airtight and/or watertight enclosure of the internal volume.

In various embodiments, the body includes a power interface configured to receive a power interface of the payload.

In various embodiments, the body power interface is accessible from the internal volume.

In various embodiments, the body power interface is a power supply interface.

In various embodiments, the payload power interface is a power supply interface.

In various embodiments, the body includes a communications interface configured to receive a communications interface of the payload.

In various embodiments, the body communications interface is accessible from the internal volume.

In accordance with aspects of the inventive concepts, provided is a removable payload apparatus for use with a mobile carrier apparatus, comprising a three-dimensional payload body and a support structure extending from the payload body, the support structure configured to engage a support surface of a rim of a mobile carrier body opening.

In various embodiments, the support surface extending from the payload body is supported above the chassis when the support surface is engaged with the support surface of the rim.

In various embodiments, the support structure extends outwardly and laterally from the payload body.

In various embodiments, the support structure is substantially flat.

In various embodiments, the support structure is substantially continuous.

In various embodiments, the support structure and the support surface are configured to suspend the removable payload within the internal volume.

In various embodiments, the removable payload is chosen from a group consisting of storage container or bin a thermal container, and an entertainment system.

In various embodiments, the payload body does not extend above the support surface.

In various embodiments, the payload body and/or support surface includes a power interface.

In various embodiments, the power interface is a power supply interface.

In various embodiments, the power interface is a power receiving interface.

In various embodiments, the payload body and/or support surface includes a communications interface.

BRIEF DESCRIPTION OF THE DRAWINGS

The present invention will become more apparent in view of the attached drawings and accompanying detailed description. The embodiments depicted therein are provided by way of example, not by way of limitation, wherein like reference numerals refer to the same or similar elements. The drawings are not necessarily to scale, emphasis instead being placed upon illustrating aspects of the invention. In the drawings.

DETAILED DESCRIPTION OF PREFERRED EMBODIMENTS

Various aspects of the inventive concepts will be described more fully hereinafter with reference to the accompanying drawings, in which some exemplary embodiments are shown. The present inventive concept may, however, be embodied in many different forms and should not be construed as limited to the exemplary embodiments set forth herein.

It will be understood that, although the terms first, second, etc. are be used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present invention. As used herein, the term "and/or" includes any and all combinations of one or more of the associated listed items.

It will be understood that when an element is referred to as being "on" or "connected" or "coupled" to another element, it can be directly on or connected or coupled to the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

Spatially relative terms, such as "beneath," "below," "lower," "above," "upper" and the like may be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as "below" and/or "beneath" other elements or features would then be oriented "above" the other elements or features. The device may be otherwise oriented (e.g., rotated 90 degrees or at other orientations) and the spatially relative descriptors used herein interpreted accordingly.

Exemplary embodiments are described herein with reference to cross-sectional illustrations that are schematic illustrations of idealized exemplary embodiments (and intermediate structures). As such, variations from the shapes of the illustrations as a result, for example, of manufacturing techniques and/or tolerances, are to be expected. Thus, exemplary embodiments should not be construed as limited to the particular shapes of regions illustrated herein but are to include deviations in shapes that result, for example, from manufacturing.

To the extent that functional features, operations, and/or steps are described herein, or otherwise understood to be included within various embodiments of the inventive concept, such functional features, operations, and/or steps can be embodied in functional blocks, units, modules, operations and/or methods. And to the extent that such functional blocks, units, modules, operations and/or methods include computer program code, such computer program code can be stored in a computer readable medium, e.g., such as non-transitory memory and media, that is executable by at least one computer processor.

Figure 1:
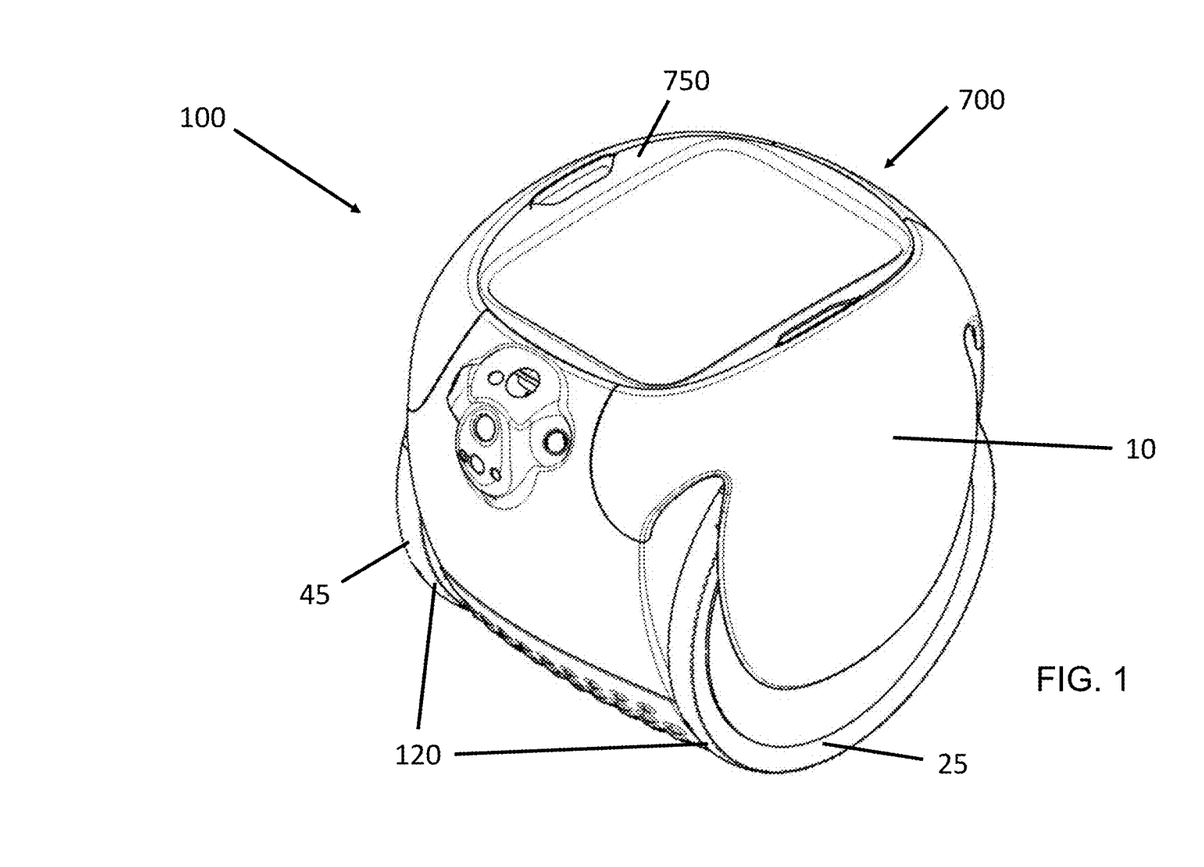
FIG. 1 is an isometric view of an embodiment of a mobile carrier, in accordance with aspects of the inventive concepts.
Figure 2:
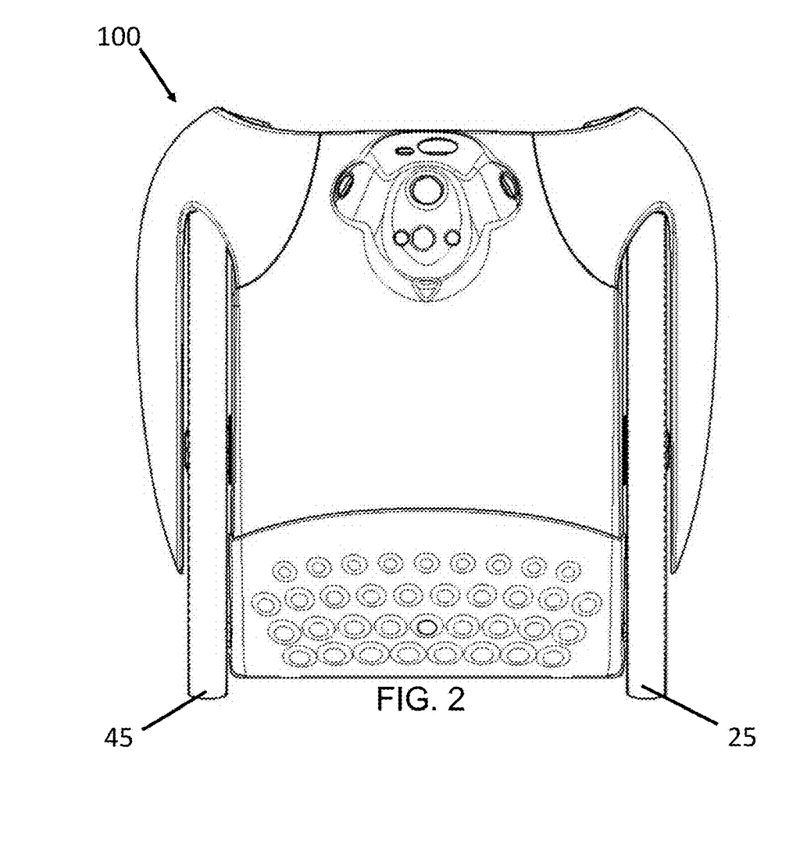
FIG. 2 is a front view of the mobile carrier of FIG. 1.
Figure 3:
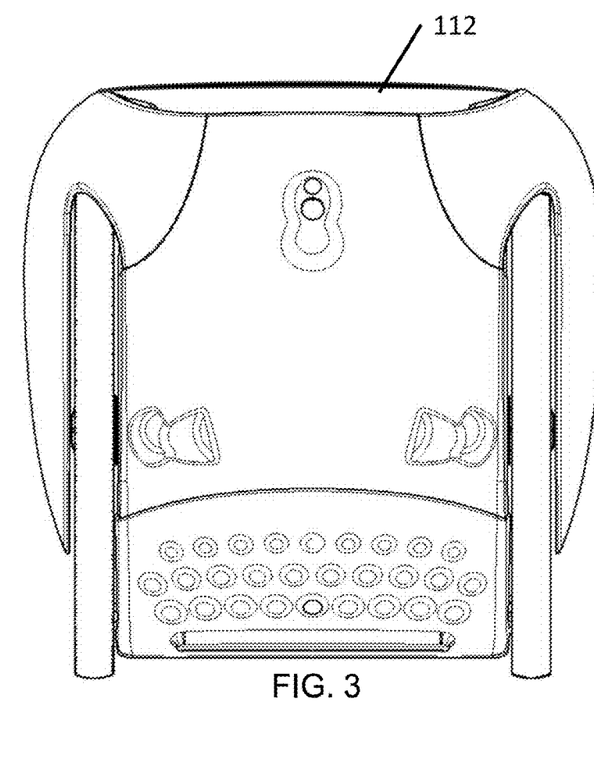
FIG. 3 is a rear view of the mobile carrier of FIG. 1.
Figure 4:
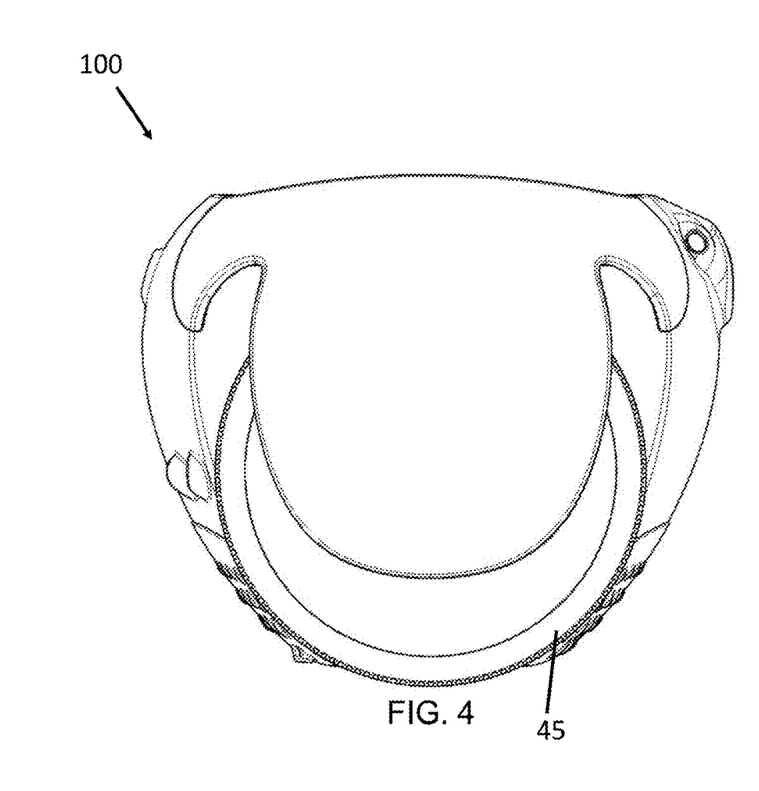
FIG. 4 is a first side view of the mobile carrier of FIG. 1.
Figure 5:
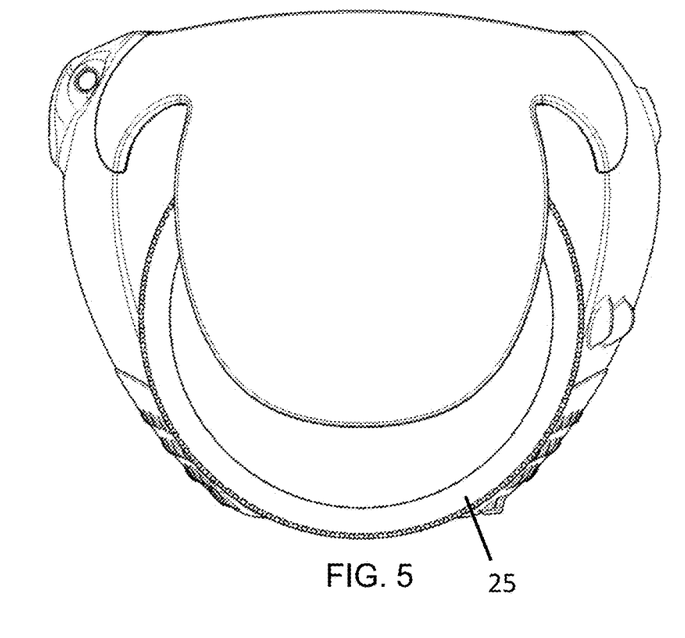
FIG. 5 a second side view of the mobile carrier of FIG. 1.
Figure 6:
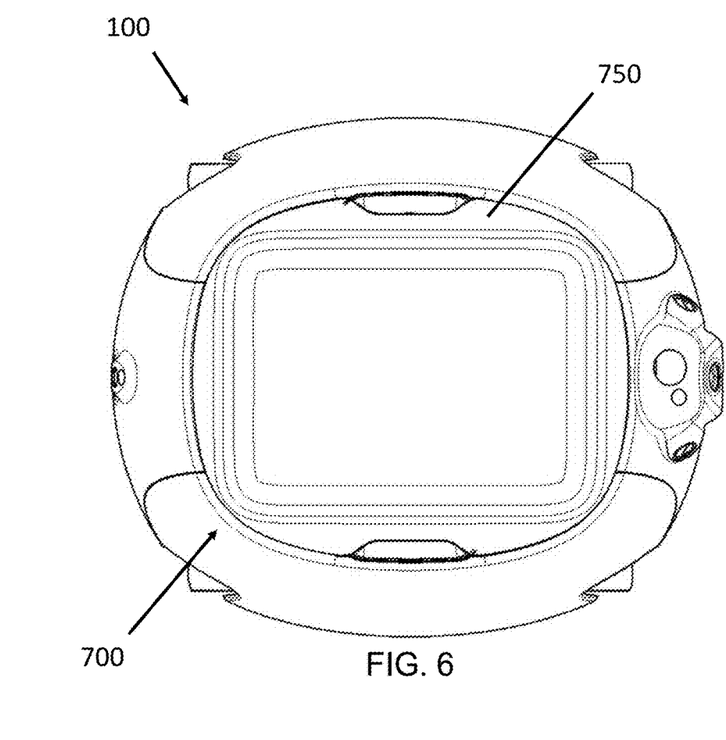
FIG. 6 a top view of the mobile carrier of FIG. 1 with a carrier lid removed.
Figure 7:
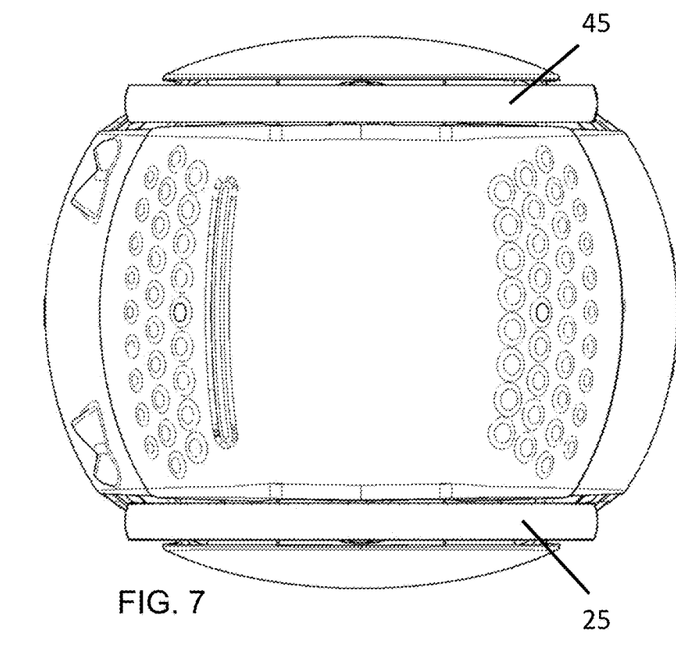
FIG. 7 a bottom view of the mobile carrier of FIG. 1.
Figure 8:
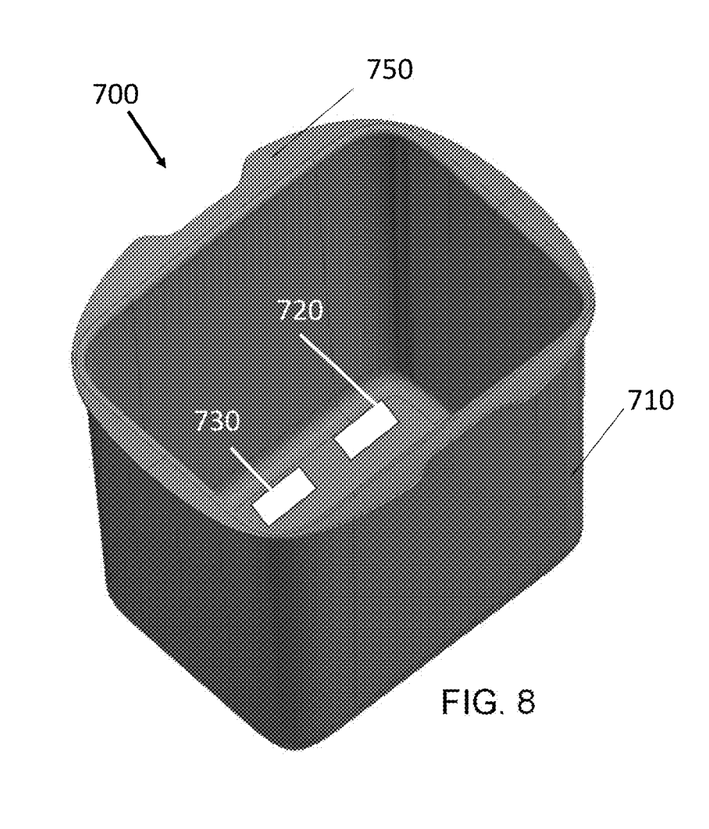
FIG. 8 a first isometric view of an embodiment of a payload that can be used with the mobile carrier of FIG. 1.
Figure 9:
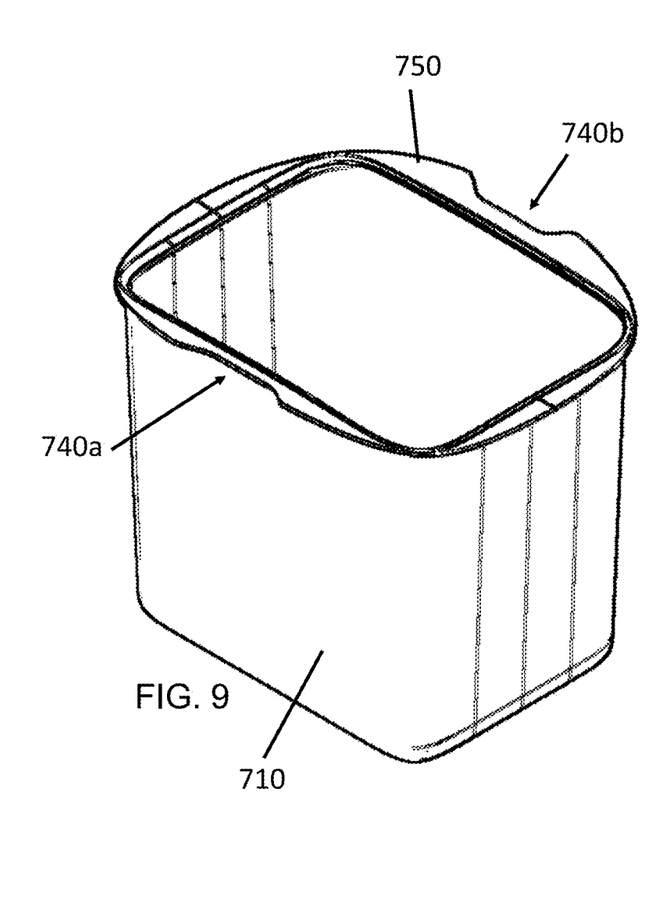
FIG. 9 is a side view of an embodiment of a payload that can be used with the mobile carrier of FIG. 1.
Figure 10:
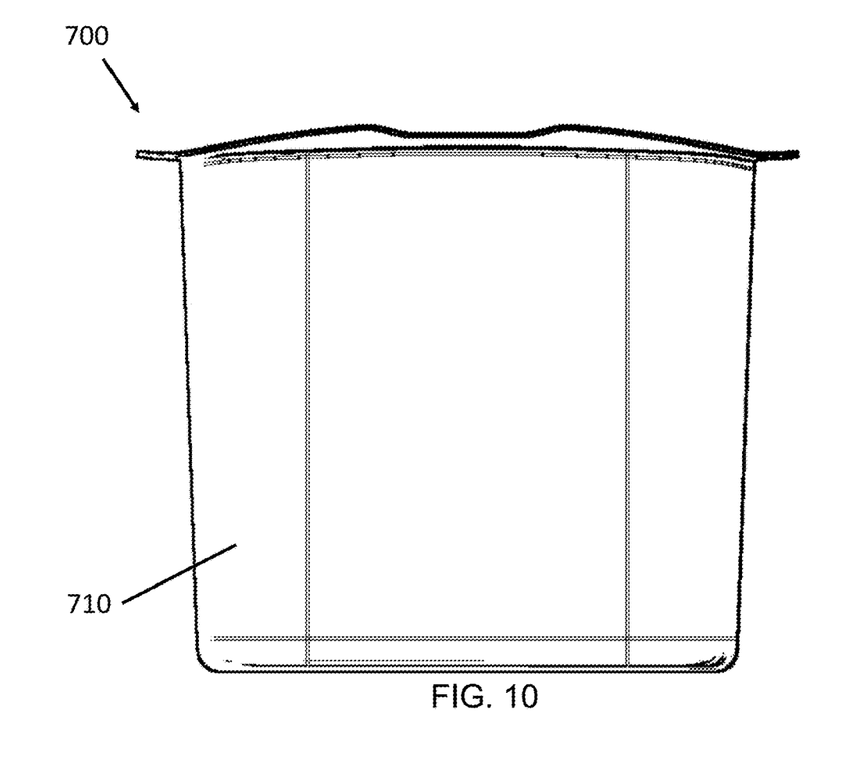
FIG. 10 is a side view of the payload of FIG. 9.
Figure 11:
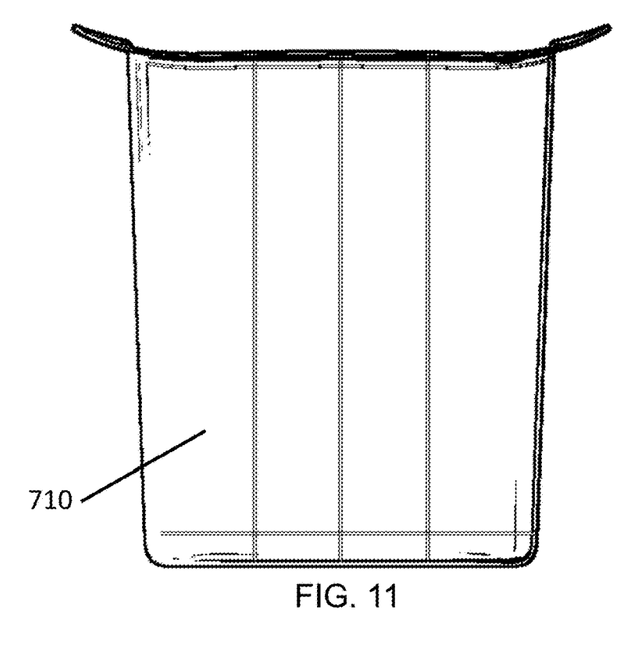
FIG. 11 is a front view of the payload of FIG. 9.

FIG. 1 is an isometric view of an embodiment of a mobile carrier 100, in accordance with aspects of the inventive concepts. FIG. 2 is a front view of the mobile carrier 100 of FIG. 1. FIG. 3 is a rear view of the mobile carrier 100 of FIG. 1. FIG. 4 is a first side view of the mobile carrier 100 of FIG. 1. FIG. 5 a second side view of the mobile carrier 100 of FIG. 1. FIG. 6 a top view of the mobile carrier 100 of FIG. 1 with a carrier lid 112 removed. FIG. 7 a bottom view of the mobile carrier 100 of FIG. 1. FIG. 8 a first isometric view of an embodiment of a payload that can be used with the mobile carrier 100 of FIG. 1. FIG. 9 is a side view of an embodiment of a payload that can be used with the mobile carrier 100 of FIG. 1. FIG. 10 is a side view of the payload of FIG. 9. And FIG. 11 is a front view of the payload of FIG. 9.

In accordance with one aspect of the present disclosure, as shown in the FIGS. 1-7, provided is a mobile carrier apparatus 100, comprising a chassis, a drive mechanism supported by the chassis and arranged to drive a plurality of wheels 120, a body 10 supported by the chassis and an internal volume defined within the body 10, and an opening in the body 10 that provides access to the internal volume, a rim 104 formed within the opening and including a support surface configured to receive and support a removable payload 700 above the chassis.

In various embodiments, the plurality of wheels 120 is two wheels, which can include first 25 and second 45 wheels partially encased by the body 10.

As shown in FIGS. 1 and 6, the support surface 155 of the rim 104 can extend laterally to have a width. The support surface of the rim can be substantially flat and/or substantially continuous. In the embodiment shown in FIG. 1, a removable payload 700 is positioned in the internal volume. In this embodiment, the support surface is below a payload support structure 750.

In various embodiments, the support surface of the rim is configured to suspend the removable payload 700 within the internal volume. The rim can be disposed at a surface of the body 10, as shown. In other embodiments, the rim can be disposed below a surface of the body 10 and within the internal volume.

In some embodiments, the rim can include a coupling mechanism configured to removably attach the payload to the rim. The coupling mechanism can include at least one magnet. In other embodiments, the coupling mechanism can, additionally or alternatively, include at least one male and/or female structure configured to receive at least corresponding female and/or male structure of the payload.

In various embodiments, the removable payload 700 is chosen from a group consisting of storage container or bin a thermal container, and an entertainment system. In FIGS. 8-11, the removable payload can take the form of a bin, which can be a refillable bin.

In various embodiments, the body 10 can include a lid 112 configured to close the opening in the body 10. The lid 112 can be configured to seal the opening in the body 10 to create an airtight and/or watertight enclosure of the internal volume. In some embodiments, the body 10 can include a power interface configured to receive a power interface of the payload. In various embodiments, the body power interface is accessible from the internal volume. In various embodiments, the body power interface is a power supply interface. In some embodiments, a payload power interface 720 is a power supply interface.

In various embodiments, the body 10 includes a communications interface configured to receive a communications interface of the payload 700. In some embodiments, the body communications interface is accessible from the internal volume.

In accordance with aspects of the inventive concepts, as shown in the embodiments of FIGS. 8-11, provided is a removable payload apparatus 700 for use with a mobile carrier apparatus 100. The payload 700 can comprise a three-dimensional payload body 710 and a support structure 750 extending from the payload body 710, the support structure 750 configured to engage a support surface of a rim of a mobile carrier body opening. In various embodiments, the removable payload 700 is chosen from a group consisting of storage container or bin a thermal container, and an entertainment system.

In various embodiments, the support structure 750 extending from the payload body 710 is supported above the chassis when the support structure 750 is engaged with the support surface of the rim. In various embodiments, the support structure 750 extends outwardly and laterally from the payload body 710. In various embodiments, the support structure 750 is substantially flat. In various embodiments, the support structure 750 is substantially continuous. In various embodiments, the support structure 750 and the support surface are configured to suspend the removable payload 700 within the internal volume.

In some embodiments, the payload comprises one or more handle mechanisms 740 constructed and arranged to assist a user in removing the payload 700 from the mobile carrier apparatus 100. In the embodiment shown in FIG. 9, the handle mechanism 740 comprises two indentations 740a, 740b. In alternative embodiments, the handle mechanism 740 comprises a handle.

In various embodiments, the payload body 710 does not extend above the support surface.

In various embodiments, the payload body 710 and/or support surface includes a power interface 720. In various embodiments, the power interface 720 is a power supply interface. In various embodiments, the power interface 720 is a power receiving interface. In various embodiments, the payload body 710 and/or support surface includes a communications interface 730.

While the foregoing has described what are considered to be the best mode and/or other preferred embodiments, it is understood that various modifications can be made therein and that the invention or inventions may be implemented in various forms and embodiments, and that they may be applied in numerous applications, only some of which have been described herein. It is intended by the following claims to claim that which is literally described and all equivalents thereto, including all modifications and variations that fall within the scope of each claim.

It is appreciated that certain features of the invention, which are, for clarity, described in the context of separate embodiments, may also be provide in combination in a single embodiment. Conversely, various features of the invention which are, for brevity, described in the context of a single embodiment may also be provided separately or in any suitable sub-combination.

For example, it will be appreciated that all of the features set out in any of the claims (whether independent or dependent) can combined in any given way.

What is claimed is:

1. A mobile carrier apparatus, comprising:
   a chassis;
   a drive mechanism supported by the chassis and arranged to drive a plurality of wheels;
   a body supported by the chassis and an internal volume defined within the body; and
   an opening in the body that provides access to the internal volume, a rim formed within the opening and including a support surface configured to receive and support a removable payload above the chassis,
   wherein the removable payload is chosen from a group consisting of a storage container or a bin, a thermal container, and an entertainment system.

2. The apparatus of claim 1, wherein the plurality of wheels is two wheels.

3. The apparatus of claim 1, wherein the plurality of wheels includes first and second wheels partially encased by the body.

4. The apparatus of claim 1, wherein the support surface of the rim extends laterally.

5. The apparatus of claim 1, wherein the support surface of the rim is configured to suspend the removable payload within the internal volume.

6. The apparatus of claim 1, wherein the support surface of the rim is disposed below a surface of the body and within the internal volume.

7. The apparatus of claim 1, wherein the rim includes a coupling mechanism configured to removably attach the payload to the rim, wherein the coupling mechanism includes at least one male and/or female structure configured to receive at least corresponding female and/or male structure of the payload.

8. The apparatus of claim 1, wherein the body includes a power supply interface configured to receive a power interface of the payload.

9. The apparatus of claim 8, wherein the power supply interface is accessible from the internal volume.

10. The apparatus of claim 1, wherein the body includes a communications interface configured to receive a communications interface of the payload.

11. The apparatus of claim 10, wherein the communications interface is accessible from the internal volume.

12. A mobile vehicle, including:
first and second wheels coupled to a chassis;
a drive mechanism configured to drive at least one of the first and second wheels;
a body supported by the chassis and defining an internal volume between the first and second wheels;
an opening in the body that provides access to the internal volume, a rim formed within the opening and including a support surface configured to receive and support a removable payload above the chassis; and
a lid configured to close the opening in the body, wherein the lid is configured to seal the opening in the body to create an airtight and/or watertight enclosure of the internal volume.

13. The mobile vehicle of claim 12, further comprising a power interface within the internal volume configured to mate with a power interface of the removable payload.

14. The mobile vehicle of claim 12, further comprising a communications interface within the internal volume configured to mate with a communications interface of the removable payload.

15. A removable payload apparatus for use with a mobile vehicle, comprising:
a three-dimensional payload body; and
a support structure extending from the payload body, wherein the support structure is configured to engage a support surface of a rim of a mobile carrier body having an opening and defining an internal volume configured to receive the payload body,
wherein the removable payload is chosen from a group consisting of a storage container or a bin, a thermal container, and an entertainment system.

16. The apparatus of claim 15, wherein the support structure extends outwardly and laterally from a top of the payload body.

17. The apparatus of claim 15, wherein the support structure is substantially flat.

18. The apparatus of claim 15, wherein the support structure is a substantially continuous surface.

19. The apparatus of claim 15, wherein the payload body and/or support surface includes a power interface.

20. The apparatus of claim 15, wherein the power interface is a power supply interface.

21. The apparatus of claim 15, wherein the payload body and/or support surface includes a communications interface.

22. A mobile carrier apparatus, comprising:
a chassis;
a drive mechanism supported by the chassis and arranged to drive a plurality of wheels;
a body supported by the chassis and an internal volume defined within the body; and
an opening in the body that provides access to the internal volume, a rim formed within the opening and including a support surface configured to receive and support a removable payload above the chassis,
wherein the rim includes a coupling mechanism configured to removably attach the payload to the rim, wherein the coupling mechanism includes at least one magnet.

23. The apparatus of claim 22, wherein the plurality of wheels is two wheels.

24. The apparatus of claim 22, wherein the plurality of wheels includes first and second wheels partially encased by the body.

25. The apparatus of claim 22, wherein the support surface of the rim extends laterally.

26. The apparatus of claim 22, wherein the support surface of the rim is configured to suspend the removable payload within the internal volume.

27. The apparatus of claim 22, wherein the support surface of the rim is disposed below a surface of the body and within the internal volume.

28. The apparatus of claim 22, wherein the rim includes a coupling mechanism configured to removably attach the payload to the rim, wherein the coupling mechanism includes at least one male and/or female structure configured to receive at least corresponding female and/or male structure of the payload.

29. The apparatus of claim 22, wherein the removable payload is chosen from a group consisting of a storage container or a bin, a thermal container, and an entertainment system.

30. The apparatus of claim 22, wherein the body includes a power supply interface configured to receive a power interface of the payload.

31. The apparatus of claim 30, wherein the power supply interface is accessible from the internal volume.

32. The apparatus of claim 22, wherein the body includes a communications interface configured to receive a communications interface of the payload.

33. The apparatus of claim 32, wherein the communications interface is accessible from the internal volume.

34. A mobile carrier apparatus, comprising:
a chassis;
a drive mechanism supported by the chassis and arranged to drive a plurality of wheels;
a body supported by the chassis and an internal volume defined within the body;
an opening in the body that provides access to the internal volume, a rim formed within the opening and including a support surface configured to receive and support a removable payload above the chassis; and
a lid configured to close the opening in the body, wherein the lid is configured to seal the opening in the body to create an airtight and/or watertight enclosure of the internal volume.

35. The apparatus of claim 34, wherein the plurality of wheels is two wheels.

36. The apparatus of claim 34, wherein the plurality of wheels includes first and second wheels partially encased by the body.

37. The apparatus of claim 34, wherein the support surface of the rim extends laterally.

38. The apparatus of claim 34, wherein the support surface of the rim is configured to suspend the removable payload within the internal volume.

39. The apparatus of claim 34, wherein the support surface of the rim is disposed below a surface of the body and within the internal volume.

40. The apparatus of claim 34, wherein the rim includes a coupling mechanism configured to removably attach the payload to the rim, wherein the coupling mechanism includes at least one magnet.

41. The apparatus of claim 34, wherein the rim includes a coupling mechanism configured to removably attach the payload to the rim, wherein the coupling mechanism includes at least one male and/or female structure configured to receive at least corresponding female and/or male structure of the payload.

42. The apparatus of claim 34, wherein the removable payload is chosen from a group consisting of a storage container or a bin, a thermal container, and an entertainment system.

43. The apparatus of claim 34, wherein the body includes a power supply interface configured to receive a power interface of the payload.

44. The apparatus of claim 43, wherein the power supply interface is accessible from the internal volume.

45. The apparatus of claim 34, wherein the body includes a communications interface configured to receive a communications interface of the payload.

46. The apparatus of claim 45, wherein the communications interface is accessible from the internal volume.

* * * * *